Oct. 6, 1931.   W. J. MAHONY   1,826,356
BEATER FOR FOODSTUFFS
Filed Dec. 22, 1930

INVENTOR.
W. J. Mahony
E. J. Featherstonhaugh
ATTORNEY.

Patented Oct. 6, 1931

1,826,356

UNITED STATES PATENT OFFICE

WILLIAM JAMES MAHONY, OF MONTREAL, QUEBEC, CANADA

BEATER FOR FOODSTUFFS

Application filed December 22, 1930. Serial No. 503,945.

The invention relates to a beater for foodstuffs, as described in the present specification and illustrated in the accompanying drawings that form part of the same.

The invention consists essentially in the novel manner in which the beaters are mounted and driven as pointed out in the claims for novelty following a description in detail of the preferred form of the invention.

The objects of the invention are to eliminate the familiar type of gear mechanism universally used as a means for operating egg beaters and thereby insure cleanliness and freedom from germs liable to collect in gear teeth or other parts and to remain until the article is bought into use; to effect a thorough churning up of the particular foodstuff being treated so that much time is saved in the preparation of foods and recipes more faithfully carried out; to simplify the mechanism in foodstuff beaters, and maintain the rotation of the beaters at a very high speed with the minimum of effort on the part of the operator; to utilize a well known principle in operation renowned for its simplicity, its speed and its efficiency and to successfully apply this principle to culinary beating devices; to produce an article of the kind that can be sold to the public at popular prices and yet insure a reasonable profit for the manufacturer; and generally to provide a beater for foodstuffs that will not only be of benefit in regard to its use, but be both durable and economical in so far as production is concerned.

In the drawings, Figure 1 is a vertical elevational view of the beater complete.

Like numerals of reference indicate corresponding parts in the various figures.

Figure 1:
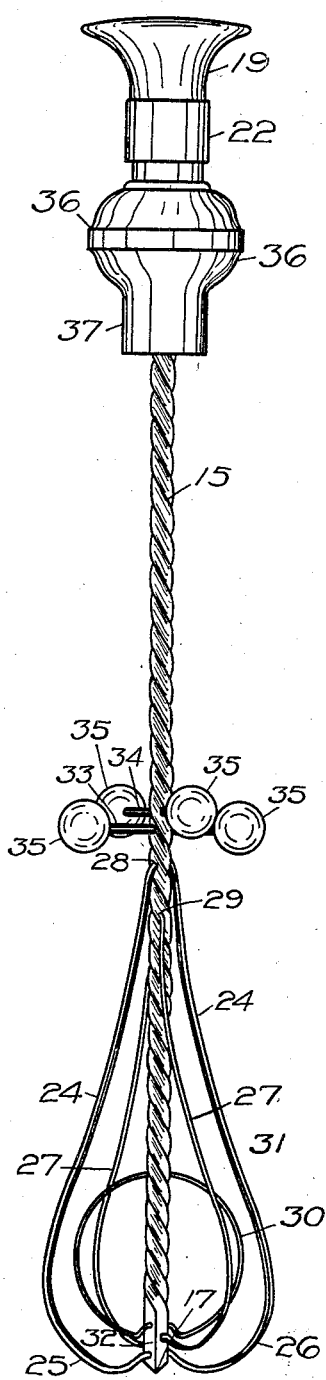
Figure 2:
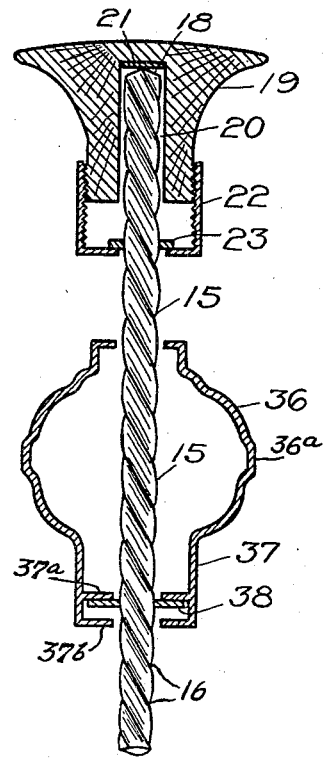
Figure 2 is an enlarged sectional detail of the handle and the driver showing the shaft broken away.
Figure 3:
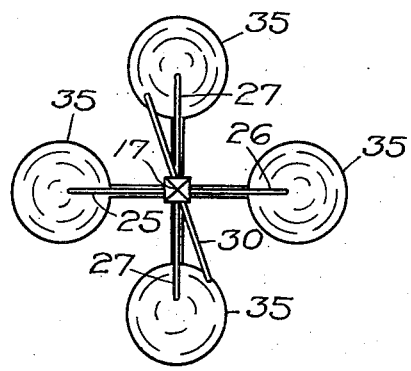
Figure 3 is an enlarged plan view of the governors and beaters, showing the shaft in cross section.

Referring to the drawings, the shaft, indicated by the numeral 15 is of a type suitable for what is often termed the spiral friction driving mechanism, though in this particular case the spiral grooves in the shaft 15 are of quite open formation and extend from end to end, that is to say, shallow grooves that prove very effective as a bar to the collection of foodstuff material thereon and at the same time materially cheapen the production of the article by running from end to end of the shaft, this shaft terminating at the lower end in the point bearing 17 and at the upper end in the point bearing 18 there being no special finishing at the upper end or at the lower end entailing expensive machine work.

The handle 19 contains a central blind hole 20 extending inwardly from its underside and at the bottom of this blind hole the disc 21 receives the point bearing 18.

The handle 19 is screwed into the sleeve 22 loosely mounted on the shaft 15 towards the upper end and stopped by the collar 23, therefore as the handle pulls on the sleeve against the collar 23 it becomes tightened up, yet leaving the shaft 15 free to rotate in said handle without in any way rubbing the encircling parts to cause wear.

The lower end of the shaft, that is to say, the point bearing 17 is applied to the dish or vessel in which the foodstuff is contained and the beaters 24 are threaded through the shaft 15 adjacent to the point 17 and recessed in said shaft to bring the beating elements at 25 and 26 close to the bottom of the dish or vessel on either side of the point 17.

The beaters 27 are slightly above the beaters 24 and also threaded through the shaft and recessed, but remain at a higher level than the beaters 24.

The beaters 24 are brought around and converge as they reach upwardly and are again threaded through the shaft at 28 and secured, while the beaters 27 are threaded through the shaft at 29 slightly below the upper end of the beaters 24 and secured.

The circular beater 30 is threaded through the shaft intermediately of the height of the beaters 24 and 27 at 31 and extends in a plane between the plane of the beaters 24 and 27 and is secured to the shaft slightly above the point bearing 17, this shaft if necessary at the lower point where the beaters are secured being flattened on four sides as shown at 32.

Immediately above the upper end of the beaters 24 the radial cross rods 33 and 34 are rigidly secured, preferably extending through the shaft or they may be secured in any suitable fashion.

The balance weights 35 in the form of balls are carried at the ends of the radial cross rods 33 and 34 slightly above the beaters and cooperate with the means for turning the shaft in increasing the speed and in maintaining the continuity of operation in a single direction, notwithstanding the necessity of an idle stroke in the operating means as will be explained more fully hereinafter.

The momentum maintained between power strokes of the operating member, as will be seen is, without doubt the outstanding feature of this device and no matter what particular means may be used in regard to the revolution of the shaft, this force for maintaining the momentum will always be required, in other words, the construction of the driving nut is immaterial, though it must have a power stroke and it must have an idle stroke.

The driving nut 36 is shown as of very simple construction, in fact no particular feature of this nut is emphasized, for the very good reason that it is no part of the invention, merely an incident in carrying out the invention. Therefore the hand grip 36a which is preferably in shell form carries at the lower end the cylindrical extension 37 having the disk like heads or ends 37a and 37b, which may be likened unto stationary disks.

The operating disk 38 is centrally perforated to fit in the spiral groove 16 in the shaft 15 and this operating disk is contained in the closed cylindrical extension mentioned aforesaid and on the downward stroke which may be called the power stroke, this disk 38 is engaged by the disk like end 37a so that the said disk 38 will not rotate and as pressure is brought to bear on the hand grip the shaft must rotate.

This pressure is not necessarily a steady pressure, even it may be said that it is more of a jerk than a pressure, for in all such devices the method of operation is to some extent acquired as in the use of most tools.

The return stroke or idle stroke is simply lifting up the disk 38 for the next power stroke and this is accomplished by a natural movement, for it will be noticed that when the power stroke is finished the disk 38 is rapidly rotating, because there is no pressure remaining, with the result that the lower disk end 37b merely keeps touching the operating disk 38 and as the path of the spiral groove is the line of least resistance, it slides up readily for its next stroke.

It will be found expedient to construct the meeting faces of the disk for the power stroke in a manner that will insure on efficient operative connection, but as this is only incidental to the invention it need not be described further herein.

In the operation of this invention the driver in shell form is drawn upwardly and pushed downwardly in rapid succession rotating the beaters 24, 27 and 30 at great speed and naturally the governors, and the consequence of this is that the beaters engage the foodstuff and whip it until it is in the desired condition, as in the action of beating eggs,— the eggs in a minute will be in a froth and cream likewise, and this is accomplished, not actually by the great speed attained by the beaters in this device, but by the measured rotation, no matter what the speed of it may be, through governing it or balancing it by means of the weighted balls.

The point bearing at the lower end of the shaft is placed in the bowl or vessel and the handle preferably palmed and then the driver is lifted and brought down with the result that the grooved shaft is brought into coaction with the driver member, thereby rotating the shaft rapidly at each downward stroke.

What I claim is:—

1. In a beater for foodstuffs, a spirally grooved shaft carrying beaters at the lower end portion, balance weights fixedly mounted on said shaft and forming a momentum member, and a driving member containing a loose operating disk engaging a fixed disk under pressure and having means to effect rotation of said shaft when moved in one direction and to provide a freely movable connection therewith when moved in the opposite direction whereby the shaft is maintained in continued rotation by said balanced weights.

2. In a beater for foodstuffs, a shaft having a spiral driving groove and terminating at one end in a centering projection and at the other in a handle forming a bearing, a momentum member mounted on said shaft, lobe shape and ring beaters secured above said centering projection and dropping therearound and a driving member having cooperatively related loose and fixed disks operatively connected to said shaft and having means to effect driving action of said shaft when moved in one direction and arranged to be freely movable when moved in the opposite direction.

3. In a beater for foodstuffs, a spirally grooved shaft, a handle forming a bearing for the upper end of said shaft, beaters carried towards the lower end, a driving member having a grip portion and a disk box containing an operating disk engaging said shaft in said groove for the operation thereof on the pressure of a disk end of said box on the operating disk and otherwise free between upper and lower disk ends and a balanced weighted momentum member mounted on said shaft and adapted to maintain the momentum of the shaft during the idle stroke and allow free rotation of the disk between disk box ends.

4. In a beater for foodstuffs, a spirally grooved shaft with beaters and a disk non-rotatively mounted on said shaft in said groove, means for exerting pressure on said disk on the down stroke and releasing the pressure on the upstroke of said means and means for maintaining the momentum of said shaft gained in the down stroke and thereby rotating the said disk with said shaft in the upstroke.

5. In a beater for foodstuffs, a spirally grooved shaft and operating disk operatively connected with said shaft and mounted for longitudinal movement along said shaft and provided with means to engage with it on the down stroke and having means permitting it to freely rotate on the upstroke, beaters driven by the rotation of said shaft, and balance ball weights fixedly and radially held outwardly from said shaft.

6. In a beater for foodstuffs, a shaft terminating at the upper and lower ends in centering points and spirally grooved therebetween, a plurality of elongated and lobe shaped beaters looped upwardly and secured to said shaft around said lower centering point, a circular beater within said lobe shaped beaters, a handle containing a bearing for the said upper centering point and secured to said shaft, balanced weights supported from said shaft above said beaters and a driving nut formed of an operating disk threaded on said shaft and a grip holder having means for exerting pressure and securely holding said disk from rotation during the power stroke and for relieving this pressure during the idle stroke and lightly carrying the disk in rotation with the shaft therealong.

Signed at Montreal, Canada, this 3rd day of December 1930.

WILLIAM JAMES MAHONY.